United States Patent
Sayles et al.

(10) Patent No.: US 10,951,699 B1
(45) Date of Patent: Mar. 16, 2021

(54) STORAGE SYSTEM WITH ASYNCHRONOUS MESSAGING BETWEEN PROCESSING MODULES FOR DATA REPLICATION

(71) Applicant: EMC Corporation, Hopkinton, MA (US)

(72) Inventors: Christopher Sayles, Framingham, MA (US); Xiangping Chen, Sherborn, MA (US); William Stronge, Westford, MA (US); David Meiri, Somerville, MA (US); Archana Parasnis, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 226 days.

(21) Appl. No.: 15/824,536

(22) Filed: Nov. 28, 2017

(51) Int. Cl.
*H04L 29/08* (2006.01)
*G06F 3/06* (2006.01)

(52) U.S. Cl.
CPC .......... *H04L 67/1095* (2013.01); *G06F 3/065* (2013.01); *G06F 3/067* (2013.01); *H04L 67/1097* (2013.01)

(58) Field of Classification Search
CPC .. G06F 3/065; G06F 11/2069; G06F 12/1018; G06F 2201/805; G06F 3/0607; G06F 3/067; G06F 3/0688; G06F 11/1068; G06F 16/90339; G06F 3/061; G06F 3/0638; H04L 67/1095; H04L 67/1097
See application file for complete search history.

(56) References Cited

U.S. PATENT DOCUMENTS 7,165,155 B1 * 1/2007 Duprey ............... G06F 11/1451
 711/162
7,444,464 B2 10/2008 Urmston et al.
(Continued)

OTHER PUBLICATIONS

Introduction to the EMC XtremIO Storage Array (Ver. 4.0): A Detailed Review, Published by EMC, Apr. 2015, 65 pages (Year: 2015).*

(Continued)

*Primary Examiner* — Jason D Recek
*Assistant Examiner* — Ranjan Pant
(74) *Attorney, Agent, or Firm* — Ryan, Mason & Lewis, LLP

(57) ABSTRACT

A first storage system in one illustrative embodiment is configured to participate in a replication process with a second storage system. Each of a plurality of storage nodes of the first storage system comprises a plurality of storage devices and a set of processing modules configured to communicate with corresponding sets of processing modules on other ones of the storage nodes. In conjunction with the replication process, a first one of the processing modules is configured to generate a request message for transmission to a second one of the processing modules requesting that the second processing module transfer designated replication data to the second storage system. The request message comprises a unique message identifier that the second processing module incorporates into a subsequent response message transmitted back to the first processing module to indicate a result of the requested transfer of the designated replication data to the second storage system.

20 Claims, 9 Drawing Sheets

(56) References Cited

U.S. PATENT DOCUMENTS

| | | | | |
|---|---|---|---|---|
| 8,095,726 | B1* | 1/2012 | O'Connell | G06F 12/1018 707/822 |
| 8,214,612 | B1 | 7/2012 | Natanzon | |
| 8,335,899 | B1* | 12/2012 | Meiri | G06F 11/2076 711/162 |
| 8,619,986 | B2* | 12/2013 | Drucker | H04L 9/083 380/255 |
| 9,087,012 | B1* | 7/2015 | Hayes | H04L 67/1095 |
| 9,104,326 | B2* | 8/2015 | Frank | G06F 3/061 |
| 9,606,870 | B1 | 3/2017 | Meiri et al. | |
| 9,716,754 | B2* | 7/2017 | Swift | H04L 67/1095 |
| 2007/0022121 | A1* | 1/2007 | Bahar | G06F 9/5011 |
| 2008/0279462 | A1 | 11/2008 | Celi, Jr. | |
| 2009/0132955 | A1 | 5/2009 | Garg et al. | |
| 2010/0179941 | A1 | 7/2010 | Agrawal et al. | |
| 2010/0287264 | A1* | 11/2010 | Lopes | G06F 9/44505 709/221 |
| 2012/0124282 | A1* | 5/2012 | Frank | G06F 3/061 711/108 |
| 2013/0325824 | A1 | 12/2013 | Shoens | |
| 2014/0087697 | A1* | 3/2014 | Johnston | H04W 4/08 455/412.1 |
| 2014/0181016 | A1 | 6/2014 | Whitehead et al. | |
| 2015/0281374 | A1* | 10/2015 | Petersen | H04L 67/16 709/223 |
| 2015/0288636 | A1* | 10/2015 | Yalavarty | H04L 51/16 709/206 |
| 2015/0363215 | A1* | 12/2015 | Versteeg | G06F 11/3684 703/23 |
| 2016/0150012 | A1* | 5/2016 | Barszczak | G06F 16/27 709/219 |
| 2016/0202927 | A1* | 7/2016 | Klarakis | G06F 3/0619 709/217 |
| 2016/0224259 | A1 | 8/2016 | Ahrens et al. | |

OTHER PUBLICATIONS

Internet draft "Reconnendations for Generating Message IDs", Jul. 1998, http://www.eyrie.org/~eagle/useffor/drafts/draft-IETF-usefor-message-id-01.txt , pp. 1-4 (Year: 1998).*

EMC Corporation, "Introduction to the EMC XtremIO Storage Array (Ver. 4.0): A Detailed Review," White Paper, Apr. 2015, 65 pages.

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

ITZIKR, "DellEMC XtremIO X2/X1 Management, Part 1, The CAS Architecture = Simplicity?," https://xtremio.me/2017/05/08/dellemc-xtremio-x2x1-management-part-1-the-cas-architecture-simplicity/, May 8, 2017, 6 pages.

EMC Corporation, "High Availability, Data Protection and Data Integrity in the XtremIO Architecture," White Paper, Apr. 2015, 28 pages.

ITZIKR, "DellEMC XtremIO X2 Tech Preview #2—Native Replication," https://xtremio.me/2017/05/09/dellemc-xtremio-x2-tech-preview-2-native-replication/, May 9, 2017, 8 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

U.S. Appl. No. 15/662,708 filed in the name of Xianping Chen et al. filed Jul. 28, 2017 and entitled "Token-Based Data Flow Control in a Clustered Storage System."

U.S. Appl. No. 15/662,809 filed in the name of William Stronge et al. filed Jul. 28, 2017 and entitled "Automatic Verification of Asynchronously Replicated Data."

U.S. Appl. No. 15/662,833 filed in the name of William Stronge et al. filed Jul. 28, 2017 and entitled "Signature Generator for Use in Comparing Sets of Data in a Content Addressable Storage System."

U.S. Appl. No. 15/793,121 filed in the name of David Meiri et al. filed Oct. 25, 2017 and entitled "Opportunistic Compression of Replicated Data in a Content Addressable Storage System."

U.S. Appl. No. 15/793,147 filed in the name of Ernesto Blanco et al. filed Oct. 25, 2017 and entitled "Compression Signaling for Replication Process in a Content Addressable Storage System."

* cited by examiner

STORAGE SYSTEM WITH ASYNCHRONOUS MESSAGING BETWEEN PROCESSING MODULES FOR DATA REPLICATION

FIELD

The field relates generally to information processing systems, and more particularly to storage in information processing systems.

BACKGROUND

Many information processing systems are configured to replicate data from a storage system at one site to a storage system at another site. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business. Data replication in these and other contexts can be implemented using asynchronous replication. For example, asynchronous replication may be configured to periodically transfer data in multiple cycles from a source site to a target site. Conventional approaches to data replication can be problematic under certain conditions. For example, in clustered storage systems implemented using multiple distributed storage nodes interconnected by one or more networks, replicating data between source and target sites separated by long distances can lead to excessive round-trip messaging latencies, thereby undermining the efficiency of the replication process. This can in turn make it difficult to achieve a desired recover point objective within the information processing system.

SUMMARY

Illustrative embodiments provide asynchronous messaging for data replication in information processing systems. Such embodiments can advantageously provide significantly improved efficiency in asynchronous replication and other types of data replication processes carried out between a source site and a target site of a given information processing system. For example, these embodiments are configured to accommodate arbitrary round-trip messaging latencies that can arise when performing data replication over long distances, and are therefore better able to achieve desired recover point objectives within the information processing system. These embodiments illustratively include a clustered implementation of a content addressable storage system having a distributed storage controller. Similar advantages can be provided in other types of storage systems.

In one embodiment, an apparatus comprises a first storage system comprising a plurality of storage nodes. The first storage system is configured to participate in a replication process with a second storage system. Each of the storage nodes of the first storage system comprises a plurality of storage devices. Each of the storage nodes of the first storage system further comprises a set of processing modules configured to communicate over one or more networks with corresponding sets of processing modules on other ones of the storage nodes. The sets of processing modules of the storage nodes collectively comprise at least a portion of a distributed storage controller of the first storage system.

In conjunction with the replication process, a first one of the processing modules is configured to generate a request message for transmission to a second one of the processing modules requesting that the second processing module transfer designated replication data to the second storage system. The request message comprises a unique message identifier that the second processing module incorporates into a subsequent response message transmitted back to the first processing module to indicate a result of the requested transfer of the designated replication data to the second storage system. The unique message identifier thereby relates the request message to the subsequent response message so as to support asynchronous messaging between the first and second processing modules for the requested transfer of the designated replication data within the replication process.

In some embodiments, each of the sets of processing modules comprises a plurality of control modules and a plurality of routing modules. In one possible arrangement of this type, the above-noted first and second processing modules can respectively comprise a given one of the control modules and a given one of the routing modules. The given control module in such an arrangement is configured to generate the request message as a control-to-routing message for transmission to the given routing module requesting that the given routing module transfer designated replication data to the second storage system. The control-to-routing message comprises the unique message identifier that the given routing module incorporates into the subsequent response message as a routing-to-control message transmitted back to the given control module to indicate the result of the requested transfer of the designated replication data to the second storage system. The unique message identifier thereby relates the control-to-routing message to the routing-to-control message so as to support asynchronous messaging between the given control module and the given routing module for the requested transfer of the designated replication data within the replication process.

The control-to-routing message and the routing-to-control message illustratively comprise respective synchronous messages of the first storage system that are separately acknowledged within a designated synchronous messaging timeout period by respective receiving ones of the given routing and control modules.

An elapsed time between transmission of the control-to-routing message by the given control module to the given routing module and receipt of the routing-to-control message by the given control module from the given routing module is greater than the designated synchronous messaging timeout period.

The control-to-routing message illustratively has a designated asynchronous messaging timeout period associated therewith. The asynchronous messaging timeout period is substantially longer than the designated synchronous messaging timeout period, so as to better accommodate the above-noted arbitrary round-trip messaging latencies that can arise when replicating data over long distances. The given control module is configured to retry transmission of another control-to-routing message comprising a different unique message identifier if the routing-to-control message is not received from the given routing module within the designated asynchronous messaging timeout period.

The first and second storage systems illustratively comprise respective content addressable storage systems having respective sets of non-volatile memory storage devices. For example, the storage devices of the first and second storage systems in such embodiments can be configured to collectively provide respective all-flash storage arrays. The first and second storage systems may be associated with respective source and target sites of the replication process. For example, the source site may comprise a production site data center and the target site may comprise a disaster recovery site data center. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
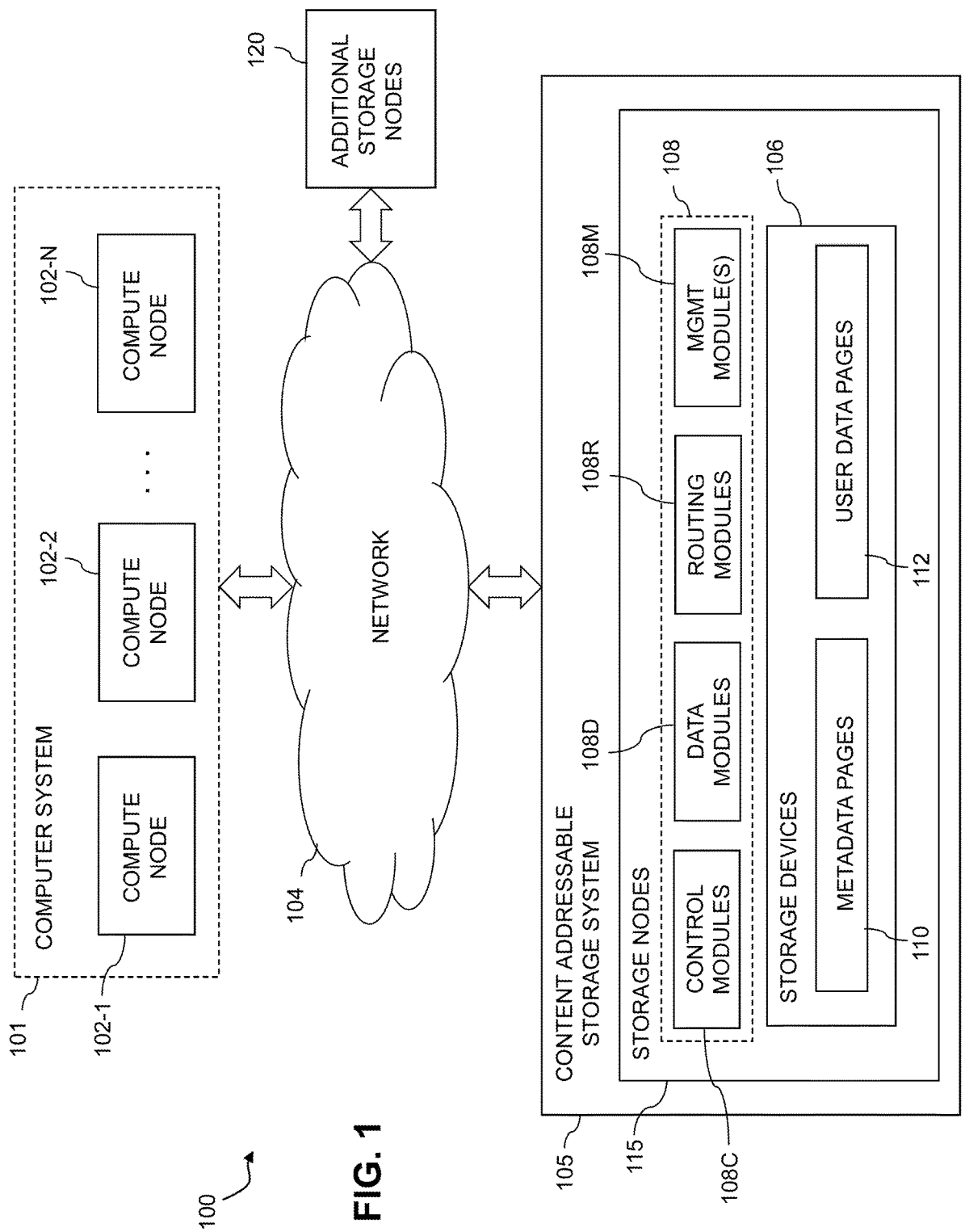
FIG. 1 is a block diagram of an information processing system comprising a content addressable storage system configured with functionality for asynchronous messaging between processing modules for data replication in an illustrative embodiment.

FIG. 1 shows an information processing system 100 configured in accordance with an illustrative embodiment. The information processing system 100 comprises a computer system 101 that includes compute nodes 102-1, 102-2, ... 102-N. The compute nodes 102 communicate over a network 104 with a content addressable storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the compute nodes 102 of the computer system 101 over the network 104. The content addressable storage system 105 comprises a plurality of storage devices 106 and an associated storage controller 108. The storage devices 106 are configured to store metadata pages 110 and user data pages 112, and may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB or other values can be used. Accordingly, illustrative embodiments can utilize any of a wide variety of alternative paging arrangements for organizing the metadata pages 110 and the user data pages 112.

The user data pages 112 are part of a plurality of logical units (LUNs) configured to store files, blocks, objects or other arrangements of data on behalf of users associated with compute nodes 102. Each such LUN may comprise particular ones of the above-noted pages of the user data area. The user data stored in the user data pages 112 can include any type of user data that may be utilized in the system 100. The term "user data" herein is therefore also intended to be broadly construed.

It is assumed in the present embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective ones of the user data pages 112 and corresponding physical locations of those pages in the user data area. Such content-based digests are examples of what are more generally referred to herein as "content-based signatures" of the respective user data pages 112. The hash metadata generated by the content addressable storage system 105 is illustratively stored as metadata pages 110 in the metadata area.

The generation and storage of the hash metadata is assumed to be performed under the control of the storage controller 108. The hash metadata may be stored in the metadata area in a plurality of entries corresponding to respective buckets each comprising multiple cache lines, although other arrangements can be used.

Figure 2:
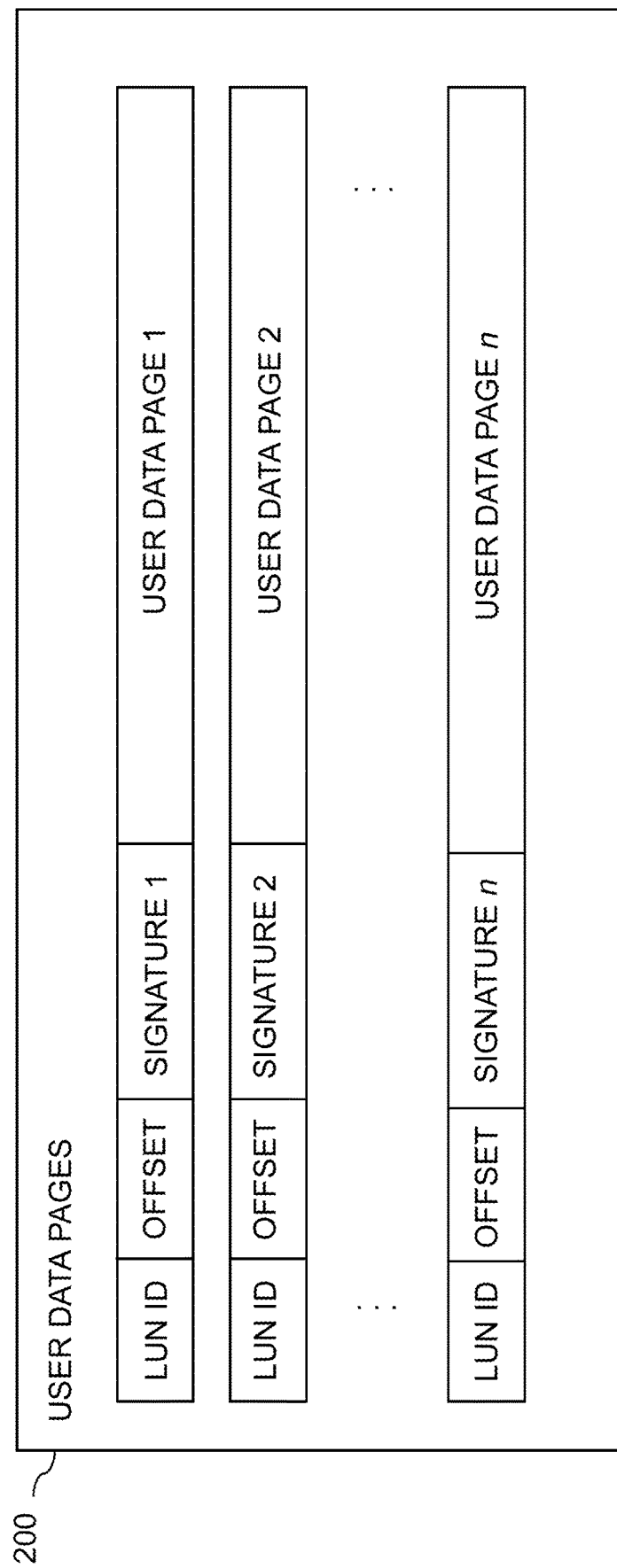
FIG. 2 shows an example of a set of user data pages in an illustrative embodiment.

Each of the metadata pages 110 characterizes a plurality of the user data pages 112. For example, as illustrated in FIG. 2, a given set of user data pages 200 representing a portion of the user data pages 112 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106 of the content addressable storage system 105.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

Figure 3:
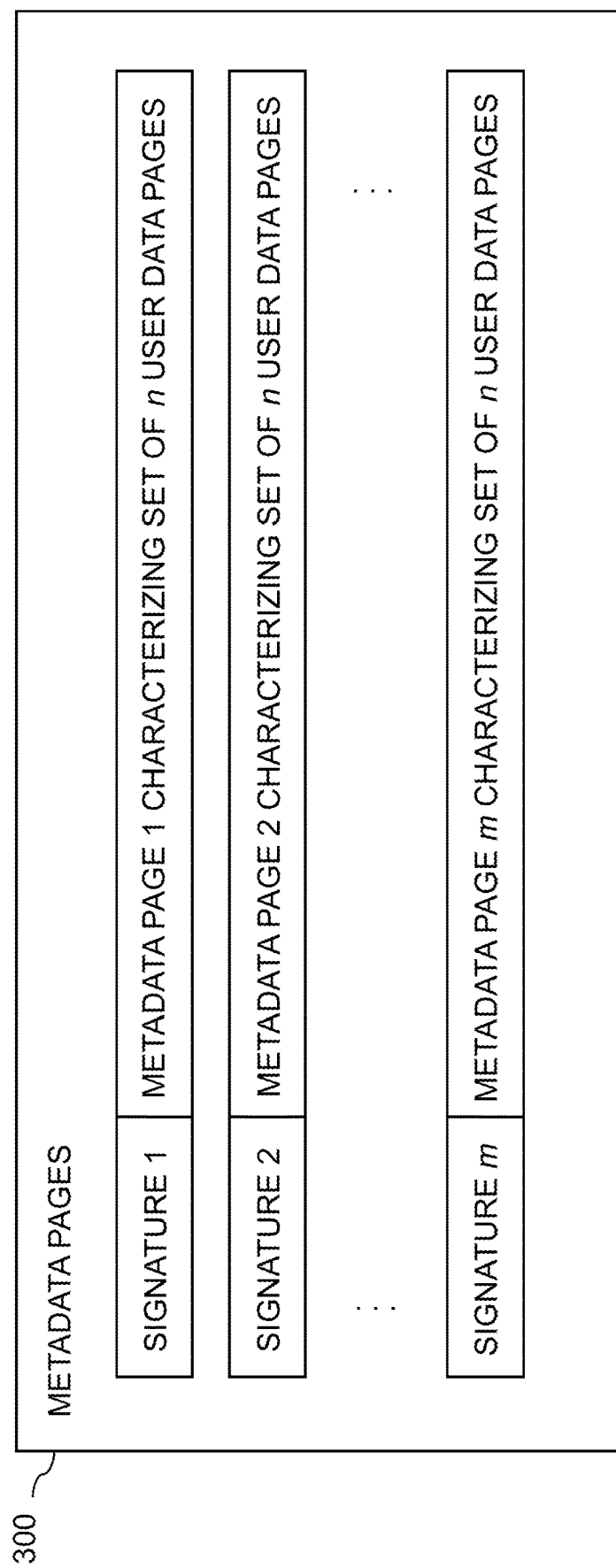
FIG. 3 shows an example of a set of metadata pages in an illustrative embodiment.

This is illustrated in FIG. 3, which shows a given set of metadata pages 300 representing a portion of the metadata pages 110 in an illustrative embodiment. The metadata pages in this example include metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations shown in FIGS. 2 and 3 are examples only, and numerous alternative user data and metadata page configurations can be used in other embodiments.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, the additional storage nodes 120 may be part of another clustered storage system of the system 100. Each of the storage nodes 115 and 120 of the system 100 is assumed to be implemented using at least one processing device comprising a processor coupled to a memory.

The storage controller 108 of the content addressable storage system 105 is implemented in a distributed manner so as to comprise a plurality of distributed storage controller components implemented on respective ones of the storage nodes 115 of the content addressable storage system 105. The storage controller 108 is therefore an example of what is more generally referred to herein as a "distributed storage controller." In subsequent description herein, the storage controller 108 may be more particularly referred to as a distributed storage controller.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The distributed storage controller 108 in the present embodiment is configured to implement functionality for asynchronous messaging between processing modules for a replication process carried out between the content addressable storage system 105 and another storage system. The term "replication process" as used herein is intended to be broadly construed, so as to encompass a single replication process that includes separate asynchronous and synchronous replication modes, as well as a replication process that includes multiple separate asynchronous and synchronous replication processes. In an arrangement of the latter type, the asynchronous and synchronous replication processes are also considered examples of what are more generally referred to herein as respective asynchronous and synchronous "replication modes." A given replication process as that term is generally used herein can in some cases include only an asynchronous replication process, also referred to as an asynchronous replication mode, and no other replication modes.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Communication links are established between the various processing modules of the distributed storage controller 108 using well-known communication protocols such as Transmission Control Protocol (TCP) and Internet Protocol (IP). For example, respective sets of IP links used in replication data transfer could be associated with respective different ones of the routing modules 108R and each such set of IP links could include a different bandwidth configuration.

Ownership of a user data logical address space within the content addressable storage system 105 is illustratively distributed among the control modules 108C. The management module 108M may include a replication engine or other arrangement of replication control logic that engages corresponding replication control logic instances in all of the control modules 108C and routing modules 108R in order to implement a data replication process within the system 100, as will be described in more detail below in conjunction with FIG. 4. The data replication process illustratively involves replicating data from one portion of a storage system to another portion of that system, or from one storage system to another storage system. It is desirable in these and other data replication contexts to implement asynchronous messaging functionality in order to provide more efficient replication.

In some embodiments, the content addressable storage system 105 comprises an XtremIO™ storage array suitably modified to incorporate asynchronous messaging techniques as disclosed herein. In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, asynchronous messaging functionality in some embodiments is implemented under the control of at least one system-wide management module of the distributed storage controller 108.

In the above-described XtremIO™ storage array example, each user data page typically has a size of 8 KB and its content-based signature is a 20-byte signature generated using an SHA1 hash function. Also, each page has a LUN identifier and an offset, and so is characterized by <lun_id, offset, signature>.

As mentioned previously, storage controller components in an XtremIO™ storage array illustratively include C-module and D-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

The content addressable storage system 105 in the FIG. 1 embodiment is assumed to be configured to participate in a replication process with a second storage system that is not explicitly shown in the figure. The content addressable storage system 105 is an example of what is referred to herein as a "first storage system" relative to the second storage system. In certain description below, the content addressable storage system 105 will therefore be referred to as the first storage system. Each of the first and second storage systems comprises a plurality of storage devices, such as flash-based storage devices.

The replication process is illustratively implemented utilizing what is referred to herein as a cycle-based asynchronous replication process. Other types of asynchronous or synchronous replication processes can be used in other embodiments.

More particularly, in this embodiment, the storage controller of the first storage system comprises replication control logic configured to cooperatively interact with corresponding replication control logic in a storage controller of the second storage system in order to execute a cycle-based asynchronous replication process carried out between the first and second storage systems. The second storage system can be implemented on the same processing platform as the first storage system or on a different processing platform. The replication control logic of a given one of the first and second storage systems may comprise software, hardware or firmware, or combinations thereof, implemented in one or more storage node processing modules, such as control modules, data modules, routing modules and management modules of a distributed storage controller of the corresponding storage system.

The first and second storage system in this embodiment are further assumed to be implemented as respective clustered storage systems each having a plurality of storage nodes implementing a distributed storage controller such as distributed storage controller 108 of content addressable storage system 105.

Each of the storage nodes of the first storage system comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of a distributed storage controller of the first storage system, such as the distributed storage controller 108. The storage nodes of the second storage system are assumed to be configured in a similar manner.

In conjunction with the replication process, a first one of the processing modules of the first storage system is configured to generate a request message for transmission to a second one of the processing modules of the first storage system. The request message is configured to request that the second processing module transfer designated replication data to the second storage system. The request message comprises a unique message identifier that the second processing module incorporates into a subsequent response message transmitted back to the first processing module to indicate a result of the requested transfer of the designated replication data to the second storage system. The unique message identifier thereby relates the request message to the subsequent response message so as to support asynchronous messaging between the first and second processing modules for the requested transfer of the designated replication data within the replication process.

Figure 4:
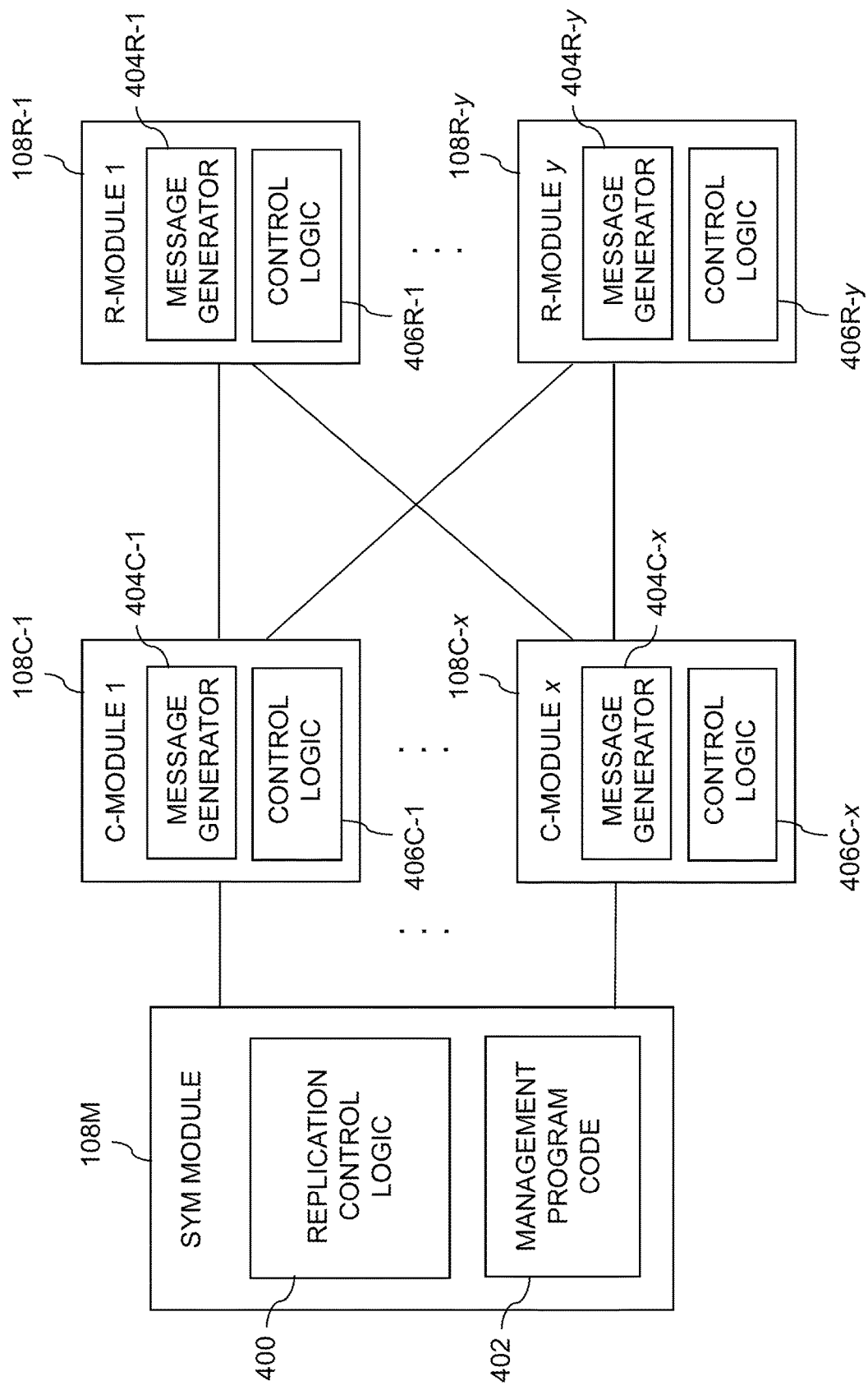
FIG. 4 illustrates a portion of a distributed storage controller of a content addressable storage system showing one possible arrangement supporting asynchronous messaging between control modules and routing modules of the distributed storage controller.

Referring now to FIG. 4, a more detailed view of a portion of the distributed storage controller 108 in an illustrative embodiment is shown. This embodiment illustrates an example of communications between control modules 108C and routing modules 108R of the distributed storage controller 108.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises replication control logic 400 and associated management program code 402. The management module 108M communicates with control modules 108C-1 through 108C-x, also denoted as C-module 1 through C-module x. The control modules 108C communicate with routing modules 108R-1 through 108R-y, also denoted as R-module 1 through R-module y. The variables x and y are arbitrary integers greater than one, and may but need not be equal. In some embodiments, each of the storage nodes 115 of the content addressable storage system 105 comprises one of the control modules 108C and one of the routing modules 108R, as well as one or more additional modules including one of the data modules 108D.

The control modules 108C-1 through 108C-x in the FIG. 4 embodiment comprise respective message generators 404C-1 through 404C-x. These message generators 404C are utilized by corresponding instances of replication control logic 406C-1 through 406C-x to generate control-to-routing messages to one or more of the routing modules 108R in conjunction with a replication process.

The replication process is assumed to be a cycle-based asynchronous replication process in which the control modules 108C scan differences in the designated replication data between replication cycles, and send corresponding data transfer requests as needed to the routing modules 108R. The routing modules 108R in turn replicate the data to a remote storage node cluster of the second storage system, and then respond to the control modules 108C regarding the data replication results.

For example, a data transfer request for a given data page in an asynchronous replication mode is illustratively initiated by a given one of the control modules 108C directing a control-to-routing message to a given one of the routing modules 108R. The control-to-routing message is generated by the corresponding one of the message generators 404C, under the control of the corresponding instance of replication control logic 406C, operating in conjunction with replication control logic 400 of the management module 108M. The control-to-routing message comprises a logical page address of the given data page, including an identifier of a corresponding LUN and an offset of the given data page within the LUN. It also includes a current content-based signature for the data page, and may include additional information, such as various external identifying information for the corresponding storage volume.

The routing modules 108R-1 through 108R-y in the FIG. 4 embodiment comprise respective message generators 404R-1 through 404R-y. These message generators 404R are utilized by corresponding instances of replication control logic 406R-1 through 406R-y to generate routing-to-control messages for transmission to one or more of the control modules 108C in conjunction with the replication process.

As indicated above, a given one of the control modules 108C is configured to generate a request message as a control-to-routing message for transmission to a given one of the routing modules 108R requesting that the given routing module transfer designated replication data to the second storage system. The control-to-routing message comprising a unique message identifier that the given routing module incorporates into its subsequent response message as a routing-to-control message transmitted back to the given control module to indicate a result of the requested transfer of the designated replication data to the second storage system. The unique message identifier thereby relates the control-to-routing message to the routing-to-control message so as to support asynchronous messaging between the given control module and the given routing module for the requested transfer of the designated replication data within the replication process.

The control-to-routing message and the routing-to-control message illustratively comprise respective synchronous messages of the first storage system that are separately acknowledged within a designated synchronous messaging timeout period by respective receiving ones of the given routing and control modules.

An elapsed time between transmission of the control-to-routing message by the given control module to the given routing module and receipt of the corresponding routing-to-control message by the given control module from the given routing module may be greater than the designated synchronous messaging timeout period.

In some embodiments, the given routing module is configured to initiate a particular instance of a background thread for processing the control-to-routing message received from the given control module and for generating the routing-to-control message for transmission back to the given control module.

The given routing module is further configured to generate an acknowledgement of the control-to-routing message for transmission back to the given control module in conjunction with its initiation of the particular instance of the background thread.

The given control module is configured to store context information in conjunction with generating the control-to-routing message. Such context information illustratively includes the unique message identifier, and may include additional or alternative types of information.

The given control module may also be configured to initiate a particular instance of a background thread for processing the routing-to-control message received from the given routing module. The given control module is further configured to generate an acknowledgement of the routing-to-control message for transmission back to the given routing module in conjunction with its initiation of the particular instance of the background thread. The given control module is also configured to retrieve the stored context information comprising the unique message identifier in conjunction with its initiation of the particular instance of the background thread.

The unique message identifier is illustratively configured to maintain its uniqueness over a plurality of control-to-routing messages generated by the given control module and across one or more restarts of the given control module. The unique message identifiers may be generated by the control modules that initiate the data transfer requests, or elsewhere within the distributed storage controller. For example, in some embodiments, random number generators or other circuits or software for generating random or pseudorandom numbers may be used in generating the unique message identifiers. Additionally or alternatively, various collision-resistant hash functions may be used.

The unique message identifiers in some embodiments are "globally" unique within a given storage system implementation, so as to ensure that data transfer requests can be uniquely matched with the appropriate respective corresponding result responses.

The control-to-routing message generated by the given control module in the manner described above may have a designated asynchronous messaging timeout period associated therewith. The given control module may be configured to retry transmission of another control-to-routing message comprising a different unique message identifier if the routing-to-control message is not received from the given routing module within the designated asynchronous messaging timeout period.

The above-described operations of the given control module and the given routing module are carried out under the control of their respective control logic instances 406C and 406R in cooperation with the replication control logic 400 of the management module 108M. The other control logic instances 406C and 406R in the other control and routing modules 108C and 108R are similarly configured to control the transmission of control-to-routing messages and associated routing-to-control messages in order to implement portions of a replication process as disclosed herein.

As a more particular example in the XtremIO™ context, a process for asynchronous messaging between processing modules for data replication is advantageously configured to handle data replication over long distances with arbitrary round-trip latency. The C-modules, D-modules and R-modules of the storage nodes in this context are assumed to be configured to communicate with one another over a high-speed internal network such as an InfiniBand (IB) network. The C-modules, D-modules and R-modules coordinate with one another to accomplish various IO processing tasks.

Communications between the modules are subject to synchronous messaging timeout periods configured to ensure that host IO operations will not time out even if module failure recovery is needed in the distributed storage controller. However, absent the use of asynchronous messaging techniques as disclosed herein, it is possible that network issues could cause data transfer between the source and target site storage systems to take a relatively long time, which may lead to undesirable timeouts in the replication data transfer messages exchanged between the C-modules and the R-modules.

The asynchronous messaging techniques in this example allow much more resilient data replication, particularly over long distances or low-bandwidth network connections. These techniques also facilitate high availability (HA) event handling, such as storage node or module restart and failure recovery, by providing an ability to abort data transfer request messages without waiting for unduly delayed responses.

In this example, multiple asynchronous messaging connections are each configured using two synchronous messaging connections, one initiated by a C-module to send a data transfer request to an R-module, and the other initiated by the R-module to send data transfer results back to the C-module. A given such data transfer request and its corresponding result response are paired up with one another using a common global unique message identifier shared between the C-module and the R-module.

It is assumed for purposes of the present example that data transfer request messages can be sent from any C-module to any R-module in the storage node cluster of the corresponding storage system. A given data transfer request message sent from a C-module to an R-module will receive an immediate response within a synchronous messaging timeout period. The response will usually be successful and the received data transfer request message will be processed by the R-module using a background thread. An error will be returned if there is something wrong with the message or if the R-module cannot process the message. Data transfer result responses will be sent back from the R-module to the C-module as separate messages. Restart of one or more of the C-modules or R-modules are handled utilizing an appropriate number of retries, and should not lead to any loss of data.

An algorithm for implementing the asynchronous replication functionality in this particular example includes the following steps.

1. A given C-module sends a data transfer request message to a given R-module. The request message contains a unique message identifier that is used to match the response with the original request when it is returned back to the given C-module. Context information of the data transfer request is stored in the C-module, including the unique message identifier, so as to allow the C-module to correctly handle a corresponding result response message that is eventually received back from the R-module.

2. The R-module receiving the data transfer request message starts a background thread to process the message.

3. The R-module returns an acknowledgement back to the C-module to indicate that the data transfer request message was received and is being processed.

4. The R-module background thread processes the data transfer request message.

5. The R-module subsequently sends a result response message back to the C-module.

6. The C-module starts a background thread to process the result response message.

7. The C-module returns an acknowledgement back to the R-module to indicate that the result response message was received and is being processed.

8. The C-module background thread processes the result response message. This includes looking up the context information that was stored with the unique message identifier to assist in handling the response message.

The above algorithm allows data transfer request messages and result response messages to be sent from between the C-modules and the R-modules in an asynchronous manner. This represents a significant improvement relative to the more tightly coupled synchronous messaging that would otherwise be utilized for such messages exchanged between the two types of modules. The request and response messages are processed using background threads in the corresponding C-modules and R-modules. The request messages from the C-modules to the R-modules can be acknowledged very quickly by the R-modules as each R-module is simply starting a thread for message processing before returning an acknowledgement within the synchronous messaging timeout period.

C-module and R-module restarts in the above-described example algorithm are handled in the following manner.

If a C-module is restarted, there could be messages being processed by one or more R-modules for which the C-module is not ready to receive a response. If unexpected responses are received, the C-module should simply drop the response. The unique message identifiers remain unique across C-module restarts, so there will be no collisions between unique message identifiers generated before or after the C-module restart.

If an R-module is restarted, there could be messages sent by one or more C-modules for which responses are never received. The messages sent by the C-modules should therefore each have a timeout associated with them. When the timeout expires, the context associated with the original message should be deleted and the request message retried. If a response to the original message is eventually received by the C-module, that response will be dropped by the C-module since it is not expecting a response to the original message.

In the event that one or more IP links are down, the request message or response message will be retried a designated number of times. If all of the retries fail, the replication process will enter a "wait for resources" state.

Replication session state changes in some embodiments can include replication abort, replication terminate and replication freeze events. All of these events will cause the C-module to stop sending messages to the R-module. There could be data transfer request messages still in progress that are no longer needed. The responses to these messages should be dropped by the C-module as they are also no longer needed.

Another example replication state change is a replication unfreeze event. In the case of a replication unfreeze event, no special processing is needed, and messages can once again be sent from the C-module to the R-module.

The example algorithm described above is executed at the source site utilizing replication control logic instances 400, 406C and 406R of the respective storage node processing modules 108M, 108C and 108R of the first storage system.

It is to be appreciated that the particular algorithm steps are exemplary only, and can be varied in other embodiments.

Also, the particular interconnection and signaling arrangements illustrated for processing modules 108C, 108R and 108M in FIG. 4 are presented by way of example only, and can be varied in other embodiments.

In some embodiments, the replication control logic of these processing modules comprises at least a portion of a replication engine of the storage controller 108. An example of such a replication engine and its associated processing operations will be described in more detail below in conjunction with the embodiment of FIG. 6.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement asynchronous messaging functionality for data replication in a clustered storage system in other embodiments.

Although illustratively shown as being implemented within the content addressable storage system 105, the storage controller 108 in other embodiments can be implemented at least in part within the computer system 101, in another system component, or as a stand-alone component coupled to the network 104.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments at least portions of the computer system 101 and the content addressable storage system 105 are implemented on the same processing platform. The content addressable storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the compute nodes 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as computer system 101, compute nodes 102, network 104, content addressable storage system 105, storage devices 106, storage controller 108 and storage nodes 115 and 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, in some illustrative embodiments a given content addressable storage system or other type of storage system with functionality for asynchronous messaging between processing modules for data replication can be offered to cloud infrastructure customers or other users as a PaaS offering.

Figure 5:
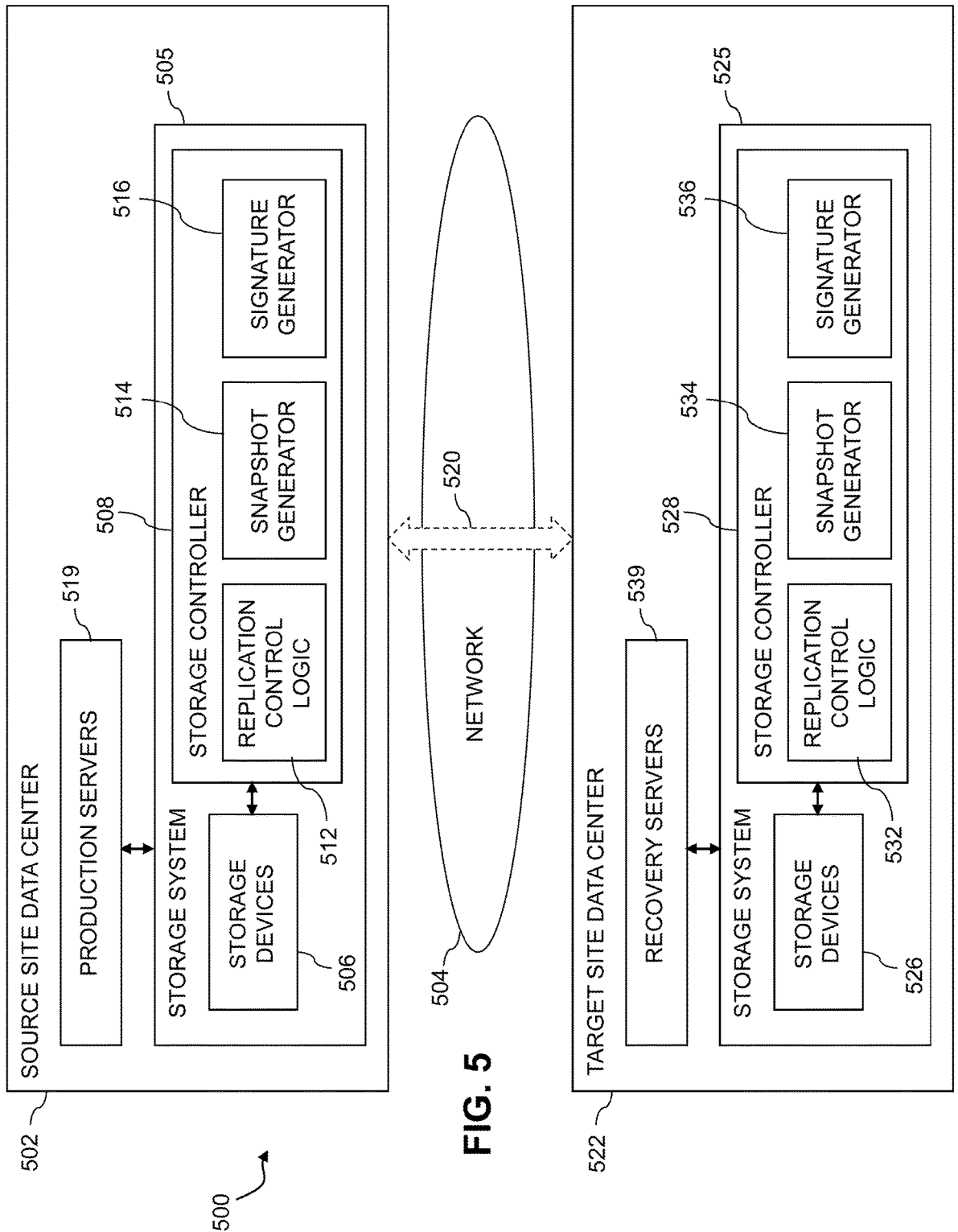
FIG. 5 is a block diagram of an information processing system comprising target site and source site storage systems configured to participate in a replication process using asynchronous messaging in an illustrative embodiment.
Figure 6:
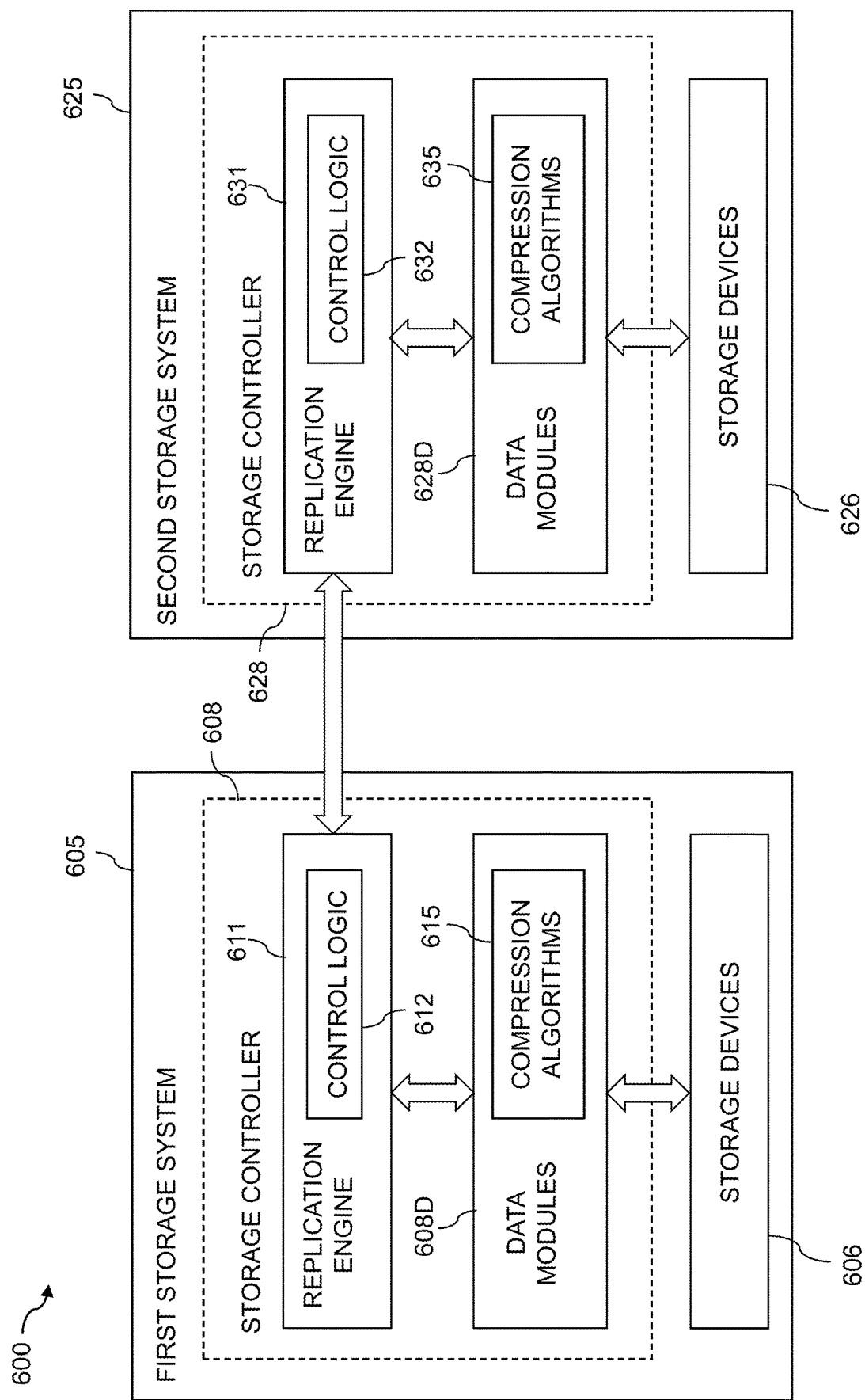
FIG. 6 illustrates interaction between replication engines implemented in respective storage controllers of respective first and second storage systems as part of a replication process in an illustrative embodiment.

Additional details of illustrative embodiments will now be described with reference to FIGS. 5, 6 and 7. FIGS. 5 and 6 illustrate examples of information processing systems that each include a first content addressable storage system such as content addressable storage system 105 of the FIG. 1 embodiment that is configured to participate in a replication process with another storage system over at least one network.

In the context of the FIG. 5 embodiment, the storage systems participating in the replication process are assumed to be associated with respective source and target sites of the replication process. For example, the source site may comprise a production site data center and the target site may comprise a disaster recovery site data center. The FIG. 6 embodiment more generally refers to the storage systems participating in the replication process as respective first and second storage systems. The first and second storage systems illustratively comprise respective content addressable storage systems having respective sets of non-volatile memory storage devices, although other types of storage systems can be used.

Referring now to FIG. 5, an information processing system 500 in an illustrative embodiment comprises a source site data center 502 coupled to at least one network 504. The source site data center 502 comprises a storage system 505 having storage devices 506 and an associated storage controller 508. The storage controller 508 comprises replication control logic 512, snapshot generator 514 and signature generator 516. The source site data center 502 further comprises a set of production servers 519 coupled to the storage system 505.

As indicated above, the storage system 505 in the present embodiment is assumed to comprise a content addressable storage system, although other types of storage systems can be used in other embodiments.

The source site data center 502 is coupled via one or more communication channels 520 of the network 504 to a target site data center 522 of the system 500. The target site data center 522 comprises a storage system 525. The storage system 525 comprises storage devices 526 and an associated storage controller 528. The storage controller 528 comprises replication control logic 532, snapshot generator 534 and signature generator 536.

The target site data center 522 further comprises a set of recovery servers 539 coupled to the storage system 525. The storage system 525, like the storage system 505, is assumed to comprise a content addressable storage system, although again other types of storage systems can be used in other embodiments.

The source site data center 502 and the target site data center 522 are examples of what are more generally referred to herein as respective ones of a "source site" and a "target site" of an information processing system. The source site data center 502 and the target site data center 522 will therefore also be referred to herein as respective source site 502 and target site 522 of the system 500. In some embodiments, the target site 522 comprises a disaster recovery site data center and the source site 502 comprises a production site data center, although other arrangements are possible.

The source site 502 and target site 522 may be implemented in respective distinct local and remote geographic locations, although it is also possible for the two sites to be within a common facility or even implemented on a common processing platform.

It is assumed that data is replicated in system 500 from the source site 502 to the target site 522 using an asynchronous replication mode. Additionally or alternatively, a given replication process may begin in an asynchronous replication mode, and subsequently transfer from the asynchronous replication mode to a synchronous replication mode. For example, the asynchronous replication mode may be used to replicate the bulk of a given set of data from the first storage system to the second storage system. The mirroring functionality of the synchronous replication mode is then enabled. Other arrangements utilizing different replication modes and different transitions between the modes are possible.

The synchronous replication mode in some embodiments is illustratively configured to mirror data writes between the first and second storage systems. For example, when a host device writes data to the first storage system, the first storage system responds to the host device with an acknowledgement of successful storage in the first storage system only after the first storage system sends the data to the second storage system and receives an acknowledgement of successful storage back from the second storage system.

The asynchronous replication mode in some embodiments implements cycle-based asynchronous replication to periodically transfer data in multiple cycles from the source site 502 to the target site 522. The data replicated from the source site 502 to the target site 522 can include all of the data stored in the storage system 505, or only certain designated subsets of the data stored in the storage system 505. Different replication processes of different types can be implemented for different parts of the stored data.

An exemplary cycle-based asynchronous replication process will now be described in more detail. Such a process is assumed to represent one possible implementation of an asynchronous replication mode of a replication process that may include both asynchronous and synchronous replications modes as well as support for concurrent operation of such modes and separate operation of the individual modes. The term "mode" as used herein in conjunction with asynchronous or synchronous replication may therefore itself comprise a corresponding asynchronous or synchronous replication process.

In order to conserve bandwidth on the communication channels 520 between the source site 502 and the target site 522, data is transferred incrementally in the asynchronous replication mode. This means that instead of sending all the data stored at the source site 502 to the target site 522 in each cycle, only the data that has been changed during each cycle is transferred. The changed data is an example of what is more generally referred to herein as "differential data." A given set of differential data transferred from the source site 502 to the target site 522 in a given one of the cycles of the cycle-based asynchronous replication process represents a "delta" between a pair of source site snapshots generated by the snapshot generator 514 of the storage controller 508 for a corresponding pair of the cycles. Each source site snapshot captures the state at a particular point in time of the data to be replicated from the source site 502 to the target site 522. It is assumed that one such source site snapshot is generated by the snapshot generator 514 in conjunction with each of the cycles of the asynchronous replication process.

A given one the cycles of the cycle-based asynchronous replication process illustratively encompasses an amount of time spent sending a corresponding one of the sets of differential data or deltas from the source site 502 to the target site 522. There is a lag time between the data at the source site 502 and the replicated data at the target site 522. More particularly, the replicated data at the target site 522 is "older" than the data at the source site 502 by the lag time, as the production servers 519 continue to write to the storage system 505 after the source site snapshots are taken for respective ones of the cycles. For example, if the cycles of the cycle-based asynchronous replication process each take 30 seconds, then the lag time in some embodiments may vary between 30 seconds and 60 seconds. A recover point objective or RPO in some embodiments can be specified as a maximum amount of lag time that the replicated data can have.

The lag time in some embodiments is more particularly specified as an amount of time between initiation of transfer of a given one of the sets of differential data by the storage system 505 of the source site 502 and update of the corresponding target site snapshot by the storage system 525 of the target site 522. It is to be appreciated, however, that other specifications of the lag time can be used.

As noted above, an advantage of transferring data incrementally from the source site 502 to the target site 522 using a cycle-based asynchronous replication process is that it conserves bandwidth on the communication channels 520. For example, each byte of data written by the production servers 519 to the storage system 505 need only be transferred once. However, the downside is that if there is problem in any one of the cycles, the replicated data at the target site 522 will be corrupted from that point on. This is a silent corruption that without appropriate verification of the replicated data will not be discovered until recovery servers 539 are started and begin to utilize the replicated data in conjunction with disaster recovery or another similar type of recovery situation. It is therefore very important for the replicated data to be verified in an appropriate manner before such a recovery situation arises.

The production servers 519 at the source site 502 illustratively run applications for users of the system 500. These servers are configured to store application data in the storage system 505. This application data is illustratively part of the data stored in storage system 505 that is replicated from the source site 502 to the target site 522. The recovery servers 539 at the target site 522 are configured to take up the running of the applications for the users of the system 500 in the event of a disaster recovery or other recovery situation. The applications on the recovery servers 539 of the target site 522 are started using the data that has been replicated to the target site 522 in the cycle-based asynchronous replication process.

The production servers 519 and recovery servers 539 of the respective source site 502 and target site 522 illustratively comprise respective processing devices of one or more processing platforms of the corresponding source site 502 or target site 522. For example, these servers can comprise respective VMs each having a processor and a memory, although numerous other configurations are possible. At least portions of the source site 502 and target site 522 can be implemented in cloud infrastructure such as an AWS system or another cloud-based system such as GCP or Microsoft Azure.

As indicated previously, the storage systems 505 and 525 of the source and target sites 502 and 522 are configured in the present embodiment for automatic verification of asynchronously replicated data over multiple cycles of a cycle-based asynchronous replication process. This illustratively involves asynchronously replicating data from the storage devices 506 of the storage system 505 to the storage devices 526 of the storage system 525 and automatically verifying the correctness of portions of the replicated data over multiple cycles.

As will be described in more detail below, the automatic verification of the asynchronously replicated data in the present embodiment may be performed in a manner that advantageously avoids the need to verify all of the transferred data in each cycle. As a result, the cycles can be made significantly more compact than would otherwise be possible. This results in enhanced efficiency in the replication process and thereby facilitates the achievement of recover point objectives in system 500.

As noted above, the storage systems 505 and 525 of the source and target sites 502 and 522 may comprise respective content addressable storage systems having respective sets of non-volatile memory storage devices.

Additionally or alternatively, the storage systems 505 and 525 of the source and target sites 502 and 522 may comprise respective clustered storage systems having respective sets of storage nodes each having a plurality of storage devices.

In some embodiments, the storage systems 505 and 525 illustratively comprise scale-out all-flash storage arrays such as XtremIO™ storage arrays from Dell EMC of Hopkinton, Mass. Other types of storage arrays, including by way of example Unity™, VNX® and Symmetrix VMAX® storage arrays also from Dell EMC, can be used to implement storage systems in other embodiments. A given such storage array can be configured to provide storage redundancy using well-known RAID techniques such as RAID 5 or RAID 6, although other storage redundancy configurations can be used.

The term "storage system" as used herein is therefore intended to be broadly construed, and should not be viewed as being limited to content addressable storage systems or flash-based storage systems.

The storage devices 506 and 526 of respective storage systems 505 and 525 illustratively implement a plurality of LUNs configured to store files, blocks, objects or other arrangements of data.

In the present embodiment, the storage system 525 of the target site 522 is configured to participate in a cycle-based asynchronous replication process with the storage system 505 of the source site 502. This cycle-based asynchronous replication process is illustratively implemented in system 500 by cooperative interaction of the storage systems 505 and 525 over network 504 using their respective replication control logic 512 and 532, snapshot generators 514 and 534, and signature generators 516 and 536. Examples of cycles of an illustrative cycle-based asynchronous replication process of this type will be described in more detail below.

The storage system 525 of the target site 522 is more particularly configured in this embodiment to receive from the storage system 505 of the source site 502, in respective ones of a plurality of cycles of the cycle-based asynchronous replication process, corresponding sets of differential data representing respective deltas between pairs of source site snapshots for respective pairs of the cycles. The source site snapshots are generated by the snapshot generator 514 of the storage controller 508.

The storage system 525 of the target site 522 illustratively utilizes the sets of differential data received in the respective ones of the cycles to update respective target site snapshots for those cycles. The target site snapshots are generated by the snapshot generator 534 of the storage controller 528.

Over multiple ones of the cycles, the storage system 525 of the target site 522 generates target site signatures for respective different portions of a designated one of the updated target site snapshots. The target site signatures are generated by the signature generator 536 of the storage controller 528. The storage system 525 also receives from the storage system 505 of the source site 502 corresponding source site signatures for respective different portions of a designated one of the source site snapshots. The source site signatures are generated by the signature generator 516 of the storage controller 508. The storage system 525 compares the target site and source site signatures over the multiple cycles in order to verify that the designated target site and source site snapshots are equivalent.

The verification of equivalence of the designated target site and source site snapshots in this embodiment is therefore spread over the multiple cycles, with pairs of target site and source site signatures for the different portions of those snapshots being compared in respective ones of the multiple cycles.

Terms such as "equivalent" and "equivalence" as used herein in conjunction with verification of replicated data by comparison of target site and source site snapshots are intended to be broadly construed to encompass various arrangements for confirming that the target site snapshot is an accurate and correct version of its corresponding source site snapshot. Such equivalence herein is a type of functional equivalence in that the replicated data when utilized by one or more applications running on the recovery servers 539 will produce the same results that would be produced by the corresponding source site data when utilized by one or more applications running on the production servers 519.

It is also important to note that the transferring of the data in cycles in this embodiment is separate from the verifying of the transferred data. The data transferred each cycle comprises the above-noted delta between two snapshots taken at respective ones of two different points in time. The data verification illustratively involves selecting a particular one of the target site snapshots, and then verifying the data in that snapshot over multiple cycles through the comparison of target site signatures for different portions of the selected target site snapshot to corresponding source site signatures. The transferred data comprising the deltas sent from the source site 502 to the target site 522 are not verified in each cycle.

The target site and source site signatures generated by the respective signature generators 516 and 536 illustratively comprise at least one of a checksum and a hash of corresponding portions of the designated target site and source site snapshots.

The different portions of the designated target site and source site snapshots for which the verification of equivalence is spread over the multiple cycles of the cycle-based asynchronous replication process may comprise respective percentages of the designated target site and source site snapshots. For example, different percentages of the designated target site and source site snapshots may be utilized in different ones of the multiple cycles. Alternatively, a fixed percentage of the designated target site and source site snapshots may be utilized in each of the multiple cycles. As a more particular example of the latter approach, the target site and source site signatures for different n percent portions of the designated target site and source site snapshots are verified in each of 100/n of the cycles.

In these and other embodiments, the different portions of the designated target site and source site snapshots for which the verification of equivalence is spread over the multiple cycles can be determined at least in part based on a number n of the cycles of the cycle-based asynchronous replication process that are expected to be executed within a given time period. For example, the different portions of the designated target site and source site snapshots for which the verification of equivalence is spread over the multiple cycles may be determined by first determining the expected number of cycles n for the given time period and then computing 100/n to determine a percentage of the designated target site and source site snapshots to be verified in each of the n cycles.

Additionally or alternatively, the different portions of the designated target site and source site snapshots for which the verification of equivalence is spread over the multiple cycles can be dynamically adapted over time in order to control a lag time between initiation of transfer of a given one of the sets of differential data by the storage system 505 of the source site 502 and update of the corresponding target site snapshot by the storage system 525 of the target site 522.

For example, such dynamic adaptation can be implemented by, for a current one of the multiple cycles, calculating a verification rate as a function of a time elapsed for verification of a given one of the portions in a previous one of the multiple cycles, calculating an amount of time remaining in a recover point objective period for the current cycle, and multiplying the verification rate by the amount of time remaining in the recover point objective period for the current cycle to determine a particular portion of the designated target site and source site snapshots to be verified in the current cycle.

If the particular portion determined by multiplying the verification rate by the amount of time remaining in the recover point objective period for the current cycle is less than a specified minimum portion, the minimum portion is verified in the current cycle.

Further details regarding automatic verification of asynchronously replicated data suitable for use in illustrative embodiments herein can be found in U.S. patent application Ser. No. 15/662,809, filed Jul. 28, 2017, now U.S. Pat. No. 10,437,855, and entitled "Automatic Verification of Asynchronously Replicated Data," which is incorporated by reference herein. Other embodiments need not utilize these automatic verification techniques, and can be implemented using alternative verification techniques as well as other types of replication processes. Accordingly, illustrative embodiments herein are not limited to use with cycle-based asynchronous replication, but are more generally applicable to other types of data replication.

The particular exemplary cycle-based asynchronous replication processes described above can be varied in other embodiments. Alternative synchronous replication processes may also be used. As mentioned previously, such processes are performed in respective asynchronous and synchronous replication modes of a replication process that incorporates both asynchronous and synchronous replication.

Each of the source site 502 and target site 522 in the FIG. 5 embodiment is assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or LXCs, or combinations of both as in an arrangement in which Docker containers or other types of LXCs are configured to run on VMs.

As a more particular example, the storage controllers 508 and 528 or various components thereof can each be implemented in the form of one or more LXCs running on one or more VMs. Other arrangements of one or more processing devices of a processing platform can be used to implement the storage controllers 508 and 528 and/or their respective components. Other portions of the system 500 can similarly be implemented using one or more processing devices of at least one processing platform.

The source site 502 and target site 522 are illustratively implemented on respective distinct processing platforms, although numerous other arrangements are possible. For example, in some embodiments at least portions of the source site 502 and the target site 522 may be implemented on the same processing platform. The term "processing platform" as used herein is intended to be broadly construed so as to encompass, by way of illustration and without limitation, multiple sets of processing devices and associated storage systems that are configured to communicate over one or more networks.

Again, it is to be appreciated that these and other features of illustrative embodiments are presented by way of example only, and should not be construed as limiting in any way. Accordingly, different numbers, types and arrangements of system components such as source and target sites 502 and 522 and their respective storage systems 505 and 525 and storage controllers 508 and 528 can be used in other embodiments. In these other embodiments, only subsets of these components, or additional or alternative sets of components, may be used, and such components may exhibit alternative functionality and configurations.

The replication process carried out between the source site storage system 505 and the target site storage system 525 in the FIG. 5 embodiment utilizes asynchronous messaging techniques of the type previously described in conjunction with the content addressable storage system 105 of FIG. 1. Examples of such asynchronous messaging arrangements will now be described in further detail with reference to FIGS. 6 and 7.

Turning now to FIG. 6, an information processing system 600 comprises a first storage system 605 comprising storage devices 606 and a distributed storage controller 608. The distributed storage controller 608 comprises a plurality of data modules 608D and a replication engine 611 having control logic 612. The data modules 608D implement compression algorithms 615 for compressing data in conjunction with storage of the data in the storage devices 606. The replication engine 611 and its associated control logic 612 may be implemented at least in part in one or more control modules and/or management modules of the distributed storage controller 608, although such modules are not explicitly shown in the figure. The distributed storage controller 608 may be viewed as corresponding to an instance of storage controller 108 of FIG. 1 or storage controller 508 or 528 of FIG. 5.

The information processing system 600 further comprises a second storage system 625 comprising storage devices 626 and a distributed storage controller 628. The distributed storage controller 628 comprises a plurality of data modules 628D and a replication engine 631 having control logic 632. The data modules 628D implement compression algorithms 635 for compressing data in conjunction with storage of the data in the storage devices 626. The replication engine 631 and its associated control logic 632 may be implemented at least in part in one or more control modules and/or management modules of the distributed storage controller 628, although such modules are not explicitly shown in the figure. The distributed storage controller 628 may be viewed as corresponding to an instance of storage controller 108 of FIG. 1 or storage controller 508 or 528 of FIG. 5.

The compression algorithms 615 and 635 can include any of a number of well-known algorithms utilized to compress data in storage systems. Such algorithms are therefore not described in detail herein.

In the FIG. 6 embodiment, the first storage system 605 is configured to participate in a replication process with the second storage system 625. The replication process is carried out at least in part by the replication engines 611 and 631 of the respective storage systems 605 and 625 as directed by control logic 612 and 632. Such control logic is an example of what is more generally referred to herein as "replication control logic," although the latter term is intended to be broadly construed and accordingly in some implementations can encompass an entire replication engine such as replication engine 611 or 631. Replication control logic as disclosed herein can be implemented at least in the part in the form of software, possibly in combination with associated hardware and/or firmware.

The data modules 608D of the first storage system 605 are assumed to be configured to implement one or more RAID algorithms that involve compressing data pages in conjunction with storage of the data pages in the storage devices 606 of the first storage system 605. At least a subset of the data modules 608D are each further assumed to comprise one or more caches in which data pages are stored in uncompressed form prior to being compressed for storage in the storage devices 606. The data modules 628D of the second storage system 625 are configured in a similar manner.

As part of the replication process, the replication engine 611 utilizes control logic 612 to request from a given one of the data modules 608D at least one data page to be replicated to the second storage system 625.

For example, replication engine 611 sends a request for one or more data pages, or other type or arrangement of data to be replicated, to the appropriate one of the data modules 608D. The data modules 608D and 628D are referred to as "backend" data modules in this embodiment relative to "frontend" components such as replication engines 611 and 631 that control the replication process.

The operation of the information processing system 600 will now be described in further detail with reference to the flow diagram of the illustrative embodiment of FIG. 7. The process as shown includes steps 700 through 710, and is suitable for use in the system 600 but is more generally applicable to other types of information processing systems, including systems 100 and 500 of respective FIGS. 1 and 5, in which multiple storage systems are configured to participate in a replication process. The steps are illustratively performed by cooperative interaction of replication engines or other arrangements of replication control logic of respective storage controllers in respective source site and target site storage systems. A given such storage controller in a source site or target site storage system can comprise a distributed storage controller implemented in the manner illustrated in FIG. 1, 5 or 6.

In step 700, a first storage system comprising a first set of storage devices is configured to participate in a replication process with a second storage system comprising a second set of storage devices.

In step 702, in conjunction with the replication process, a control module of the first storage system generates a request message for transmission to a routing module of the first storage system. The request message generated by the control module requests that the routing module transfer designated replication data to the second storage system. The request message includes a unique message identifier.

The request message in some embodiments may more particularly comprise a control-to-routing message that further includes, for each of one or more data pages of the designated replication data, a logical page address of the data page, including an identifier of a corresponding LUN and an offset of the data page within the LUN, and a content-based signature of the data page. The content-based signature illustratively comprises at least one of a checksum and a hash of content of the given data page. For example, a content-based signature may be generated using the SHA1 hash function as previously described in conjunction with the user data page signatures of FIG. 2.

In step 704, the request message including the unique message identifier is transmitted from the control module to the routing module.

In step 706, the request message is received in the routing module. The routing module processes the request message to execute the requested transfer of the designated replication data to the second storage system. The routing module subsequently generates a response message for transmission back to the control module to indicate a result of the requested transfer. The response message also includes the same unique message identifier that was included by the control module in the request message.

The unique message identifier thereby serves to relate the request message generated by the control module in step 702 to the subsequent response message generated by the routing module in step 706. Such an arrangement advantageously supports asynchronous messaging between the control module and routing module for the requested transfer of the designated replication data.

The response message generated by the routing module in step 706 is illustratively a routing-to-control message transmitted back to the control module to indicate the result of the requested transfer of the designated replication data to the second storage system. The unique message identifier therefore more particularly relates the control-to-routing message to the routing-to-control message so as to support asynchronous messaging between the control module and the routing module for the requested transfer of the designated replication data within the replication process.

The control-to-routing message and the routing-to-control message in some embodiments comprise respective synchronous messages of the first storage system that are separately acknowledged within a designated synchronous messaging timeout period by respective receiving ones of the routing and control modules. However, an elapsed time between transmission of the control-to-routing message by the control module to the routing module and receipt of the routing-to-control message by the control module from the routing module is greater than the designated synchronous messaging timeout period. Thus, the control module and routing module can communicate asynchronously with regard to a given data transfer request while also satisfying any applicable synchronous messaging timeout period.

In step 708, a determination is made as to whether or not additional data has been designated for replication from the first storage system to the second storage system as part of the replication process. For example, the designated replication data in an initial pass through step 702 may represent only a portion of a set of data to be replicated from the first storage system to the second storage system as part of the replication process. If there is additional data designated for replication from the first storage system to the second storage system, the process returns to step 702 as indicated.

It is also possible that other conditions may cause a return to step 702. For example, if the response message transmitted by the routing module to the control module in step 706 indicates an unsuccessful result for the transfer of the designated replication data, the process can return to step 702 and repeat the transfer request as necessary until the result for the transfer of the designated replication data is successful.

Figure 7:
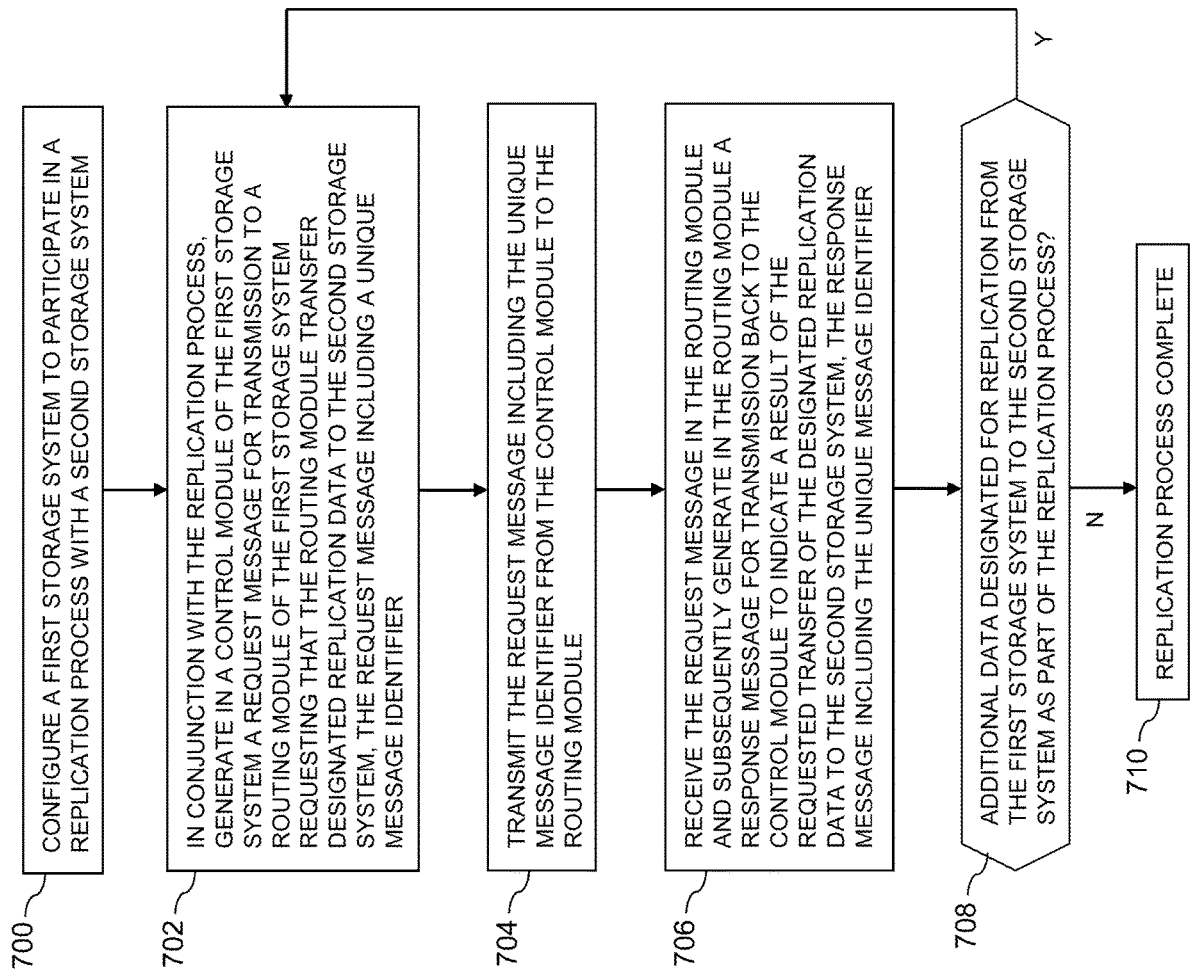
FIG. 7 is a flow diagram of a process for asynchronous messaging between processing modules for data replication in an illustrative embodiment.

Accordingly, after completion of step 708 for a given request, the FIG. 7 process may return to step 702 in order to process additional requests for data pages or other types and arrangements of data to be replicated from the source site storage system to the target site storage system as part of the replication process carried out between those two storage systems using their respective replication engines.

For example, the FIG. 7 process may be iterated for each of a plurality of data pages that are to be replicated from the source site storage system to the target site storage system as part of the replication process.

In step 710, the replication process initiated in step 700 is considered complete responsive to a negative determination in step 708. Additional replication processes can then be performed as needed, through iterated performance of respective instances of the FIG. 7 process. For example, a cycle-based asynchronous replication process may iterate the FIG. 7 process one or more times in each of a plurality of cycles.

After completion of a given replication process utilizing cycle-based asynchronous replication in an asynchronous replication mode, the first and second storage systems may transition to a different type of replication mode or process, such as a replication process that utilizes a synchronous replication mode to mirror write operations from the first storage system to the second storage system.

During at least a portion of such a transition, the first and second storage systems may concurrently operate in both asynchronous and synchronous replication modes, possibly using controlled transition functionality as disclosed in U.S. patent application Ser. No. 15/819,666, filed Nov. 21, 2017, now U.S. Pat. No. 10,496,489, and entitled "Storage System Configured for Controlled Transition Between Asynchronous and Synchronous Replication Modes," which is incorporated by reference herein.

In an arrangement of this type, it is also possible that under certain conditions, the first and second storage systems can transition back from the synchronous replication mode to the asynchronous replication mode.

It is also to be appreciated that the FIG. 7 process and other features and functionality for asynchronous messaging between processing modules for data replication as described above can be adapted for use with other types of information systems, including by way of example an information processing system in which source site and target site storage systems are both implemented on the same processing platform.

The particular processing operations and other system functionality described in conjunction with the flow diagram of FIG. 7 are presented by way of illustrative example only, and should not be construed as limiting the scope of the disclosure in any way. Alternative embodiments can use other types of processing operations for implementing asynchronous messaging between processing modules for data replication. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different asynchronous messaging processes for respective different sets of replicated data or for different storage systems or portions thereof within a given information processing system.

Functionality such as that described in conjunction with the flow diagram of FIG. 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108, 508, 528, 608 or 628 that is configured to control performance of one or more steps of the FIG. 7 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, 508, 528, 608 or 628, as well as other system components, may be implemented at least in part using processing devices of such processing platforms. For example, in a distributed implementation of the storage controller 108, 508, 528, 608 or 628, respective distributed modules of such a storage controller can be implemented in respective LXCs running on respective ones of the processing devices of a processing platform.

In some embodiments, the first and second storage systems comprise respective XtremIO™ storage arrays suitably modified to incorporate asynchronous messaging techniques as disclosed herein. As described previously, in the context of an XtremIO™ storage array, the control modules 108C, data modules 108D, routing modules 108R and management module(s) 108M of the distributed storage controller 108 in system 100 illustratively comprise C-modules, D-modules, R-modules and SYM module(s), respectively. These exemplary processing modules of the distributed storage controller 108 can be configured to implement asynchronous messaging functionality using the FIG. 7 process.

The asynchronous messaging techniques implemented in the embodiments described above can be varied in other embodiments. For example, different types of process operations can be used in other embodiments. Furthermore, although described in some embodiments in the context of data replication from a source to a target, the asynchronous messaging techniques in other embodiments can be implemented in the context of other types of data transfer within a given storage system or from one storage system to another storage system.

In addition, the above-described functionality associated with C-module, D-module, R-module and SYM module components of an XtremIO™ storage array can be incorporated into other processing modules or components of a centralized or distributed storage controller in other types of storage systems.

Illustrative embodiments of content addressable storage systems or other types of storage systems with functionality for asynchronous messaging between processing modules for data replication as disclosed herein can provide a number of significant advantages relative to conventional arrangements.

For example, some embodiments can advantageously provide significantly improved efficiency in data replication processes carried out between a source site and a target site of a given information processing system.

One or more such embodiments are configured to accommodate arbitrary round-trip messaging latencies that can arise when performing data replication over long distances, and are therefore better able to achieve desired recover point objectives within the information processing system.

Some embodiments implement an asynchronous messaging connection that utilizes multiple underlying synchronous messaging connections, including a first synchronous messaging connection initiated by a control module to send a data transfer request to a routing module, and a second synchronous messaging connection to send the corresponding data transfer result back to the control module. The data transfer request and its corresponding data transfer result are paired through utilization of a unique message identifier shared between the control module and the routing module.

Asynchronous messaging in illustrative embodiments provides a simple yet flexible mechanism to handle replication data transfer between source site and target site storage systems. Furthermore, it provides an ability to abort pending data transfer requests, which better accommodates module failure recovery and other events associated with ensuring high availability of the storage system.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing systems 100, 500 and 600 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage systems 105, 505, 525, 605 and 625, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100, 500 or 600. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments, such as systems 500 and 600.

Figure 8:
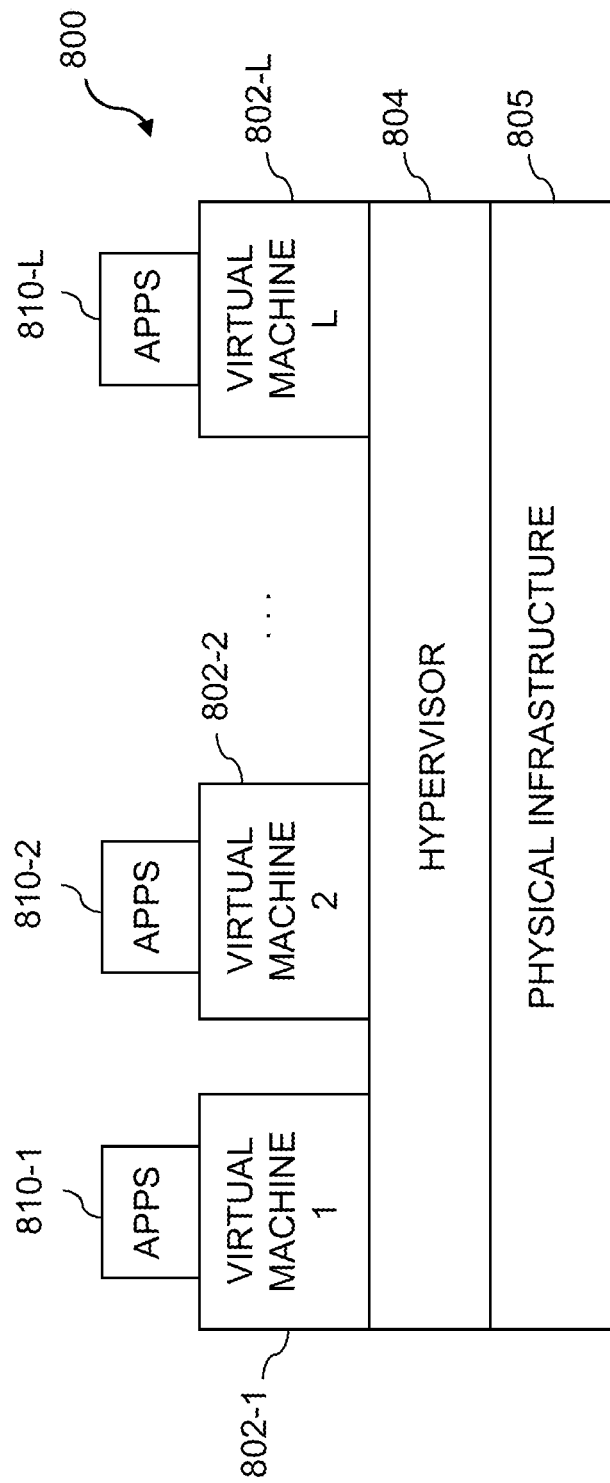
FIGS. 8 and 9 show examples of processing platforms that may be utilized to implement at least a portion of an information processing system in illustrative embodiments.
Figure 9:
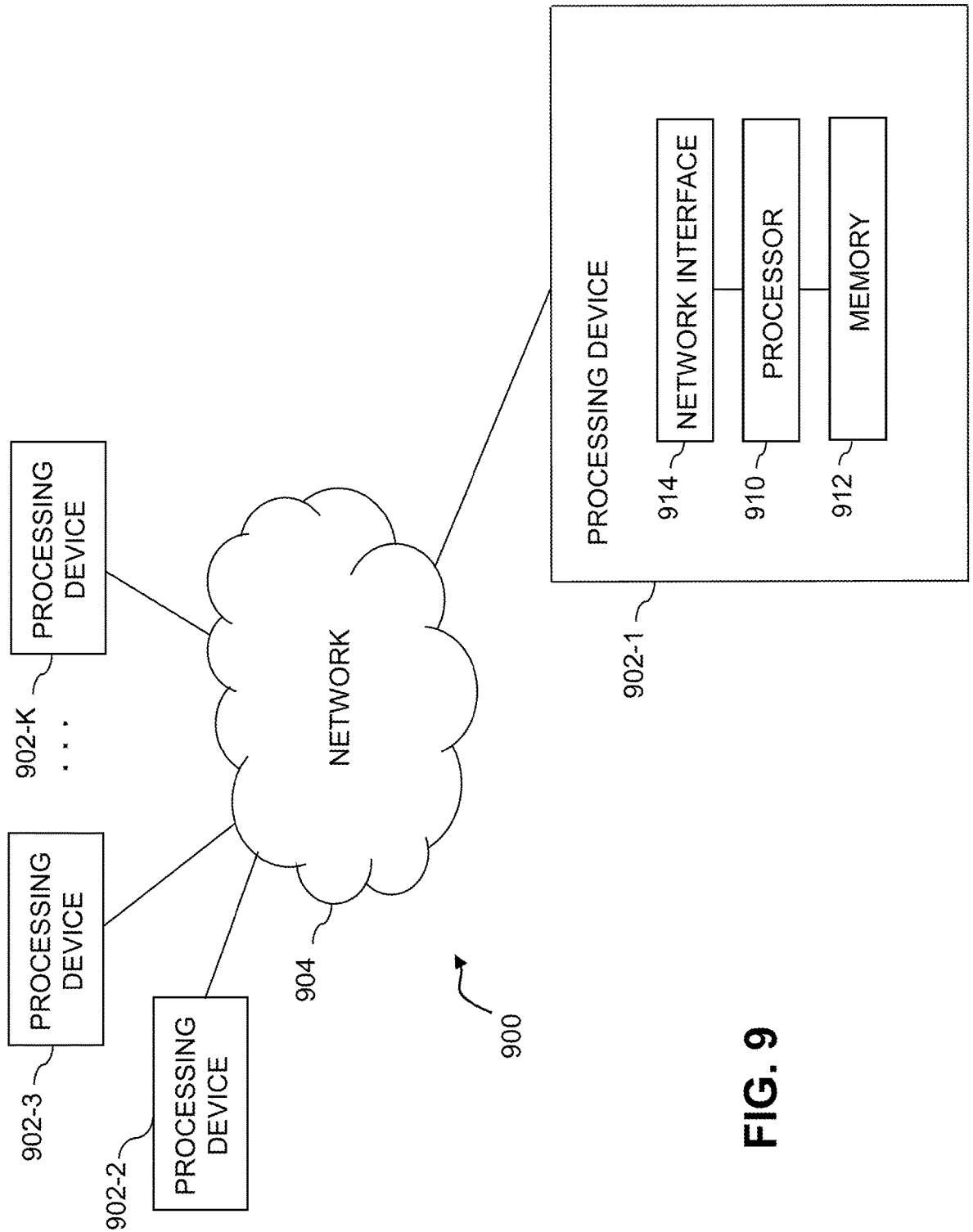

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

Although only a single hypervisor 804 is shown in the embodiment of FIG. 8, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 804 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controllers 108, 508, 528, 608 and 628 of systems 100, 500 and 600 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, source and target sites, storage systems, storage nodes, storage devices, storage controllers, replication processes, replication engines and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

a first storage system comprising a plurality of storage nodes;

the first storage system being configured to participate in a replication process with a second storage system;

each of the storage nodes of the first storage system comprising a plurality of storage devices;

each of the storage nodes of the first storage system further comprising a set of processing modules configured to communicate over one or more networks with corresponding sets of processing modules on other ones of the storage nodes;

the sets of processing modules of the storage nodes collectively comprising at least a portion of a distributed storage controller of the first storage system;

wherein in conjunction with the replication process, a first one of the processing modules is configured to generate a request message for transmission to a second one of the processing modules requesting that the second processing module transfer designated replication data to the second storage system;

the request message comprising a unique message identifier that the second processing module incorporates into a subsequent response message transmitted back to the first processing module to indicate a result of the requested transfer of the designated replication data to the second storage system;

the unique message identifier thereby relating the request message to the subsequent response message so as to support asynchronous messaging between the first and second processing modules for the requested transfer of the designated replication data within the replication process;

each of the sets of processing modules comprising a plurality of control modules and a plurality of routing modules;

the first processing module comprising a given one of the control modules;

the second processing module comprising a given one of the routing modules;

in conjunction with the replication process, the given control module is configured to generate the request message as a control-to-routing message for transmission to the given routing module requesting that the given routing module transfer the designated replication data to the second storage system;

the control-to-routing message comprising the unique message identifier that the given routing module incorporates into the subsequent response message as a routing-to-control message transmitted back to the given control module to indicate the result of the requested transfer of the designated replication data to the second storage system;

the unique message identifier thereby relating the control-to-routing message to the routing-to-control message so as to support asynchronous messaging between the given control module and the given routing module for the requested transfer of the designated replication data within the replication process;

wherein the given routing module is configured to initiate a particular instance of a background thread for processing the control-to-routing message received from the given control module; and wherein each of the storage nodes is implemented using at least one processing device comprising a processor coupled to a memory.

2. The apparatus of claim 1 wherein the first and second storage systems comprise respective content addressable storage systems having respective sets of non-volatile memory storage devices.

3. The apparatus of claim 1 wherein the first and second storage systems are associated with respective source and target sites of the replication process and wherein the source site comprises a production site data center and the target site comprises a disaster recovery site data center.

4. The apparatus of claim 1 wherein the control-to-routing message and the routing-to-control message comprise respective synchronous messages of the first storage system that are separately acknowledged within a designated synchronous messaging timeout period by respective receiving ones of the given routing and control modules and further wherein an elapsed time between transmission of the control-to-routing message by the given control module to the given routing module and receipt of the corresponding routing-to-control message by the given control module from the given routing module is greater than the designated synchronous messaging timeout period.

5. The apparatus of claim 1 wherein the particular instance of the background thread for processing the control-to-routing message received from the given control module also generates the routing-to-control message for transmission back to the given control module.

6. The apparatus of claim 5 wherein the given routing module is configured to generate an acknowledgement of the control-to-routing message for transmission back to the given control module in conjunction with its initiation of the particular instance of the background thread.

7. The apparatus of claim 1 wherein the given control module is configured to store context information in conjunction with generating the control-to-routing message and further wherein the context information includes the unique message identifier.

8. The apparatus of claim 1 wherein the given control module is configured to initiate a particular instance of a background thread for processing the routing-to-control message received from the given routing module.

9. The apparatus of claim 8 wherein the given control module is configured to perform at least one of:
generate an acknowledgement of the routing-to-control message for transmission back to the given routing module in conjunction with its initiation of the particular instance of the background thread; and
retrieve stored context information comprising the unique message identifier in conjunction with its initiation of the particular instance of the background thread.

10. The apparatus of claim 1 wherein the unique message identifier is configured to maintain its uniqueness over a plurality of control-to-routing messages generated by the given control module and across one or more restarts of the given control module.

11. The apparatus of claim 1 wherein the control-to-routing message has a designated asynchronous messaging timeout period associated therewith and further wherein the given control module is configured to retry transmission of another control-to-routing message comprising a different unique message identifier if the routing-to-control message is not received from the given routing module within the designated asynchronous messaging timeout period.

12. The apparatus of claim 1 wherein the replication process comprises a cycle-based asynchronous replication process.

13. The apparatus of claim 1 wherein the unique message identifier is randomly generated or pseudorandomly generated.

14. A method comprising:
configuring a first storage system to include a plurality of storage nodes each having a plurality of storage devices, each of the storage nodes further comprising a set of processing modules configured to communicate over one or more networks with corresponding sets of processing modules on other ones of the storage nodes;

configuring the first storage system to participate in a replication process with a second storage system; and in conjunction with the replication process, a first one of the processing modules generating a request message for transmission to a second one of the processing modules requesting that the second processing module transfer designated replication data to the second storage system;

the request message comprising a unique message identifier that the second processing module incorporates into a subsequent response message transmitted back to the first processing module to indicate a result of the requested transfer of the designated replication data to the second storage system;

the unique message identifier thereby relating the request message to the subsequent response message so as to support asynchronous messaging between the first and second processing modules for the requested transfer of the designated replication data within the replication process;

each of the sets of processing modules comprising a plurality of control modules and a plurality of routing modules;

the first processing module comprising a given one of the control modules;

the second processing module comprising a given one of the routing modules;

in conjunction with the replication process, the given control module is configured to generate the request message as a control-to-routing message for transmission to the given routing module requesting that the given routing module transfer the designated replication data to the second storage system;

the control-to-routing message comprising the unique message identifier that the given routing module incorporates into the subsequent response message as a routing-to-control message transmitted back to the given control module to indicate the result of the requested transfer of the designated replication data to the second storage system;

the unique message identifier thereby relating the control-to-routing message to the routing-to-control message so as to support asynchronous messaging between the given control module and the given routing module for the requested transfer of the designated replication data within the replication process;

wherein the given routing module is configured to initiate a particular instance of a background thread for processing the control-to-routing message received from the given control module; and wherein the method is implemented by at least one processing device comprising a processor coupled to a memory.

15. The method of claim 14 wherein the control-to-routing message and the routing-to-control message comprise respective synchronous messages of the first storage system that are separately acknowledged within a designated synchronous messaging timeout period by respective receiving ones of the given routing and control modules and further wherein an elapsed time between transmission of the control-to-routing message by the given control module to the given routing module and receipt of the routing-to-control message by the given control module from the given routing module is greater than the designated synchronous messaging timeout period.

16. The method of claim 14 wherein the unique message identifier is randomly generated or pseudorandomly generated.

17. The method of claim 14 wherein the particular instance of the background thread for processing the control-to-routing message received from the given control module also generates the routing-to-control message for transmission back to the given control module.

18. A computer program product comprising a non-transitory processor-readable storage medium having stored therein program code of one or more software programs, wherein the program code when executed by at least one processing device causes said at least one processing device:

to configure a first storage system to include a plurality of storage nodes each having a plurality of storage devices, each of the storage nodes further comprising a set of processing modules configured to communicate over one or more networks with corresponding sets of processing modules on other ones of the storage nodes;

to configure the first storage system to participate in a replication process with a second storage system; and in conjunction with the replication process, a first one of the processing modules being configured to generate a request message for transmission to a second one of the processing modules requesting that the second processing module transfer designated replication data to the second storage system;

the request message comprising a unique message identifier that the second processing module incorporates into a subsequent response message transmitted back to the first processing module to indicate a result of the requested transfer of the designated replication data to the second storage system;

the unique message identifier thereby relating the request message to the subsequent response message so as to support asynchronous messaging between the first and second processing modules for the requested transfer of the designated replication data within the replication process;

each of the sets of processing modules comprising a plurality of control modules and a plurality of routing modules;

the first processing module comprising a given one of the control modules;

the second processing module comprising a given one of the routing modules;

in conjunction with the replication process, the given control module is configured to generate the request message as a control-to-routing message for transmission to the given routing module requesting that the given routing module transfer designated replication data to the second storage system;

the control-to-routing message comprising the unique message identifier that the given routing module incorporates into the subsequent response message as a routing-to-control message transmitted back to the given control module to indicate the result of the requested transfer of the designated replication data to the second storage system;

the unique message identifier thereby relating the control-to-routing message to the routing-to-control message so as to support asynchronous messaging between the given control module and the given routing module for the requested transfer of the designated replication data within the replication process;

wherein the given routing module is configured to initiate a particular instance of a background thread for processing the control-to-routing message received from the given control module.

19. The computer program product of claim 18 wherein the control-to-routing message and the routing-to-control message comprise respective synchronous messages of the first storage system that are separately acknowledged within a designated synchronous messaging timeout period by respective receiving ones of the given routing and control modules and further wherein an elapsed time between transmission of the control-to-routing message by the given control module to the given routing module and receipt of the routing-to-control message by the given control module from the given routing module is greater than the designated synchronous messaging time out period.

20. The computer program product of claim 18 wherein the unique message identifier is randomly generated or pseudorandomly generated.

\* \* \* \* \*